United States Patent
Lehner et al.

(10) Patent No.: US 9,435,354 B2
(45) Date of Patent: Sep. 6, 2016

(54) FLUID EXCHANGER DEVICES, PRESSURE EXCHANGERS, AND RELATED METHODS

(75) Inventors: Daniela Lehner, Aarau Rohr (CH); Andreas Dreiss, Hamburg (DE); Andrew Schevets, Bethlehem, PA (US)

(73) Assignee: Flowserve Management Company, Irving, TX (US)

(*) Notice: Subject to any disclaimer, the term of this patent is extended or adjusted under 35 U.S.C. 154(b) by 817 days.

(21) Appl. No.: 13/587,722

(22) Filed: Aug. 16, 2012

(65) Prior Publication Data
US 2014/0048143 A1    Feb. 20, 2014

(51) Int. Cl.
| B01D 61/06 | (2006.01) |
| F04F 13/00 | (2009.01) |
| B01D 61/10 | (2006.01) |
| C02F 1/44 | (2006.01) |

(52) U.S. Cl.
CPC ............ F04F 13/00 (2013.01); B01D 61/06 (2013.01); B01D 61/10 (2013.01); *C02F 1/441* (2013.01); *C02F 2303/10* (2013.01); *Y10T 137/0396* (2015.04); *Y10T 137/86638* (2015.04)

(58) Field of Classification Search
CPC ....... B01D 61/06; B01D 61/10; F02B 33/42; F02C 3/02; F15B 3/00; F04F 13/00; Y10T 137/0396; Y10T 137/86638; C02F 1/441; C02F 2103/08; C02F 2303/10
USPC ........................................ 417/64; 210/321.66
See application file for complete search history.

(56) References Cited

U.S. PATENT DOCUMENTS

| 2,526,618 | A | * | 10/1950 | Darrieus | F04F 13/00 116/DIG. 22 |
| 3,209,986 | A | * | 10/1965 | Kentfield | F04F 13/00 417/64 |
| 3,234,736 | A | * | 2/1966 | Spalding | F02C 3/02 417/64 |
| 3,291,379 | A | * | 12/1966 | Herger | F04F 13/00 417/64 |
| 3,489,159 | A | | 1/1970 | Chen et al. | |
| 4,352,638 | A | * | 10/1982 | Vallance | F04F 13/00 416/DIG. 3 |
| 4,360,316 | A | * | 11/1982 | Rahnke | F04F 13/00 417/64 |
| 4,360,317 | A | * | 11/1982 | Vallance | F04F 13/00 417/64 |
| 4,887,942 | A | | 12/1989 | Hauge | |
| 5,178,521 | A | * | 1/1993 | Ikeda | F04B 27/12 184/6.17 |
| 5,306,428 | A | | 4/1994 | Tonner | |
| 5,725,758 | A | * | 3/1998 | Chace | B01D 61/027 210/134 |
| 5,797,429 | A | | 8/1998 | Shumway | |
| 6,537,035 | B2 | | 3/2003 | Shumway | |

(Continued)

FOREIGN PATENT DOCUMENTS

WO     2004111509 A1    12/2004

OTHER PUBLICATIONS

PCT International Search Report and Written Opinion for PCT Application No. PCT/US2013/055467, mailed Nov. 27, 2013.

Primary Examiner — Krishnan S Menon
Assistant Examiner — Waqaas Ali
(74) Attorney, Agent, or Firm — Magleby, Cataxinos & Greenwood, P.C.

(57) ABSTRACT

Exchanger devices include a plurality of fixed exchange ducts and a rotating valve assembly for directing flow to and from the plurality of exchange ducts. Methods of exchanging pressure between fluid streams may include directing fluids through an exchange device and pressurizing a fluid in the plurality of exchange ducts of the exchanger device.

21 Claims, 11 Drawing Sheets

(56) References Cited

U.S. PATENT DOCUMENTS

| | | | |
|---|---|---|---|
| 6,540,487 B2 * | 4/2003 | Polizos | F04B 1/2042 210/652 |
| 6,773,226 B2 * | 8/2004 | Al-Hawaj | B01D 61/06 415/116 |
| 7,207,781 B2 * | 4/2007 | Shumway | B01D 61/06 210/321.65 |
| 7,214,315 B2 * | 5/2007 | Shumway | B01D 61/06 210/137 |
| 7,306,437 B2 | 12/2007 | Hauge | |
| 7,988,428 B1 * | 8/2011 | MacHarg | B01D 61/06 417/271 |
| 7,997,853 B2 | 8/2011 | Pique et al. | |
| 8,075,281 B2 * | 12/2011 | Martin | F04F 13/00 417/64 |
| 8,308,444 B2 * | 11/2012 | Andrews | 417/64 |
| 8,622,714 B2 * | 1/2014 | Andrews | F04B 7/0023 417/64 |
| 2002/0146325 A1 * | 10/2002 | Shumway | F04F 13/00 417/64 |
| 2005/0167346 A1 * | 8/2005 | Johnson | B01D 17/0202 210/106 |
| 2006/0032808 A1 * | 2/2006 | Hauge | F04F 13/00 210/321.65 |
| 2006/0054223 A1 | 3/2006 | Baumgarten et al. | |
| 2006/0245909 A1 * | 11/2006 | Stover | F04F 13/00 415/1 |
| 2007/0212231 A1 * | 9/2007 | Bross | F04F 13/00 417/65 |
| 2009/0185917 A1 * | 7/2009 | Andrews | F04B 1/14 417/64 |
| 2010/0196152 A1 * | 8/2010 | Pique | B01D 61/06 415/208.1 |
| 2011/0176936 A1 | 7/2011 | Andrews | |
| 2012/0257991 A1 * | 10/2012 | Woodthorpe | F04F 13/00 417/64 |
| 2014/0048143 A1 * | 2/2014 | Lehner | F04F 13/00 137/14 |

* cited by examiner

FLUID EXCHANGER DEVICES, PRESSURE EXCHANGERS, AND RELATED METHODS

TECHNICAL FIELD

The present disclosure relates generally to exchange devices. More particularly, embodiments of the present disclosure relate to fluid exchange devices for one or more of exchanging properties (e.g., pressure) between fluids and mixing of fluids where the exchange device includes fixed exchange ducts and one or more rotary valves.

BACKGROUND

Pressure exchangers are sometimes called "flow-work exchangers" or "isobaric devices" and are machines for exchanging pressure energy from a relatively high-pressure flowing fluid system to a relatively low-pressure flowing fluid system. The term fluid as used herein includes gases, liquids, and pumpable mixtures of liquids and solids.

In some industrial processes, elevated pressures are required in certain parts of the operation to achieve the desired results, following which the pressurized fluid is depressurized. In other processes, some fluids used in the process are available at high-pressures and others at low-pressures, and it is desirable to exchange pressure energy between these two fluids. As a result, in some applications, great improvement in economy can be realized if pressure can be efficiently transferred between two fluids.

By way of example, there are industrial processes where a catalyst is utilized at high-pressure to cause a chemical reaction in a fluid to take place and, once the reaction has taken place, the fluid is no longer required to be at high-pressure, rather a fresh supply of fluid is required at high-pressure. In such a process, a pressure exchanger machine can be utilized to transfer the pressure of the reacted high-pressure fluid to the fresh supply of lower pressure fluid, thus improving the economy of the process by requiring less pumping energy be supplied.

Another example where a pressure exchange machine finds application is in the purification of saline solution using the reverse osmosis membrane process. In this process, an input saline solution stream is continuously pumped to high-pressure and provided to a membrane array. The input saline solution stream is continuously divided by the membrane array into a super saline solution (brine) stream, which is still at relatively high-pressure, and a purified water stream at relatively low-pressure. While the high-pressure brine stream is generally no longer useful in this process as a fluid, the flow-pressure energy that it contains has a high value. A pressure exchange machine is employed to recover the flow-pressure energy in the brine stream and transfer it to an input saline solution stream. After transfer of the pressure energy from the brine stream, the brine is expelled at low-pressure to drain by the low-pressure input saline solution stream. Thus, the use of the pressure exchanger machine reduces the amount of pumping energy required to pressurize the input saline solution stream.

U.S. Pat. No. 4,887,942 and U.S. Pat. No. 6,537,035 disclose a pressure exchanger machine for transfer of pressure energy from a liquid flow of one liquid system to a liquid flow of another liquid system. This pressure exchanger machine comprises a housing with an inlet and outlet duct for each liquid flow, and a cylindrical rotor arranged in the housing and adapted to rotate about its longitudinal axis. The cylindrical rotor is provided with a number of passages or bores extending parallel to the longitudinal axis and having an opening at each end. A piston or free piston may be inserted into each bore for separation of the liquid systems. The cylindrical rotor may be driven by a rotating shaft or by forces imparted by fluid flow. Since multiple passages or bores are aligned with the inlet and outlet ducts of both liquid systems at all times the flow in both liquid systems is essentially continuous and smooth. High rotational and thus high cyclic speed of the machine can be achieved, due to the nature of the device, with a single rotating moving part, which in turn inversely reduces the volume of the passages or bores in the rotor, resulting in a compact and economical machine.

U.S. Pat. No. 3,489,159, U.S. Pat. No. 5,306,428, U.S. Pat. No. 5,797,429 and PCT Patent Publication WO 2004/111509 all describe an alternative arrangement for a pressure exchanger machine, which utilizes one or more fixed exchanger vessels, with various valve arrangements at each end of such vessels. These machines have the advantage of there being no clear limit to scaling up in size and, with the device of WO 2004/111509, leakage between the high-pressure and low-pressure streams can be minimized. A piston may be inserted into each exchanger vessel for separation of the liquid systems.

Disadvantages of pressure exchange machines based upon U.S. Pat. No. 4,887,942 can include: that for high flow rates it is necessary to increase the size of the cylindrical rotor, and there are limitations on the amount that such a rotor can be scaled up as the centrifugal forces will attempt to break apart the rotor, similar to the problems encountered in scaling up flywheels to large sizes and speeds; that very small clearances are required between the cylindrical rotor ends and the inlet and outlet ducts to maintain low rates of leakage between the high-pressure and low-pressure fluid systems, with such leakage causing a reduction in efficiency and it being difficult to maintain such small clearances; that when operated at relatively high rotational speeds, it may not be practical to utilize a driven shaft to control rotation of the rotor, rather by non-linear forces imparted by fluid flow which can reduce the flow range over which a given device can operate efficiently; and that when operated at relatively high rotational speeds, it may not be practical to utilize a piston in the passages in the rotor, thus reducing efficiency by increasing mixing between the two fluid streams.

Disadvantages of pressure exchange machines based upon U.S. Pat. No. 3,489,159 can include: that the flow in both fluid systems is not essentially continuous and smooth unless a large number of exchanger vessels are utilized; that these devices are generally limited to low cyclic speeds due to the linear or separated nature of the valves, thus requiring relatively large volume exchanger vessels, which increases cost and size; and that due to the multiple moving parts, these devices tend to be more complex and expensive to manufacture than devices based upon U.S. Pat. No. 4,887,942.

BRIEF SUMMARY

Various embodiments of the present disclosure comprise exchanger devices that have fixed (e.g., stationary) exchange ducts, which are not part of a rotating component. Such a configuration is believed to provide a device that can be scaled up in size to accommodate very high flows, that may provide substantially continuous and smooth flow, and that may provide fluid flow paths configured to control cavitation, vibration, and other problems associated with fluid flow as compared to similar pressure exchange devices.

In some embodiments, the present disclosure includes a device for exchanging pressure between at least two fluid streams. The device includes a housing having a longitudinal axis and a middle portion forming a plurality of fixed exchange ducts extending in a direction along the longitudinal axis. Each exchange duct of the plurality fixed exchange ducts includes openings at a first longitudinal end and a second, opposing longitudinal end. The device further includes a rotating valve assembly positioned within the housing for directing flow to and from the plurality of exchange ducts. The rotating valve assembly includes a first valve positioned at and forming an axial seal with the first longitudinal end of the plurality of exchange ducts. The first valve includes a plurality of openings configured to be in selective communication with each exchange duct of the plurality of exchange ducts. The rotating valve assembly further includes a second valve positioned at and forming an axial seal with the second longitudinal end of the plurality of exchange ducts. The second valve includes a plurality of openings configured to be in selective communication with each exchange duct of the plurality of exchange ducts.

In additional embodiments, the present disclosure includes a device for exchanging pressure between at least two fluid streams. The device includes a housing having a longitudinal axis and a middle portion forming a plurality of fixed exchange ducts extending in a direction along the longitudinal axis. Each exchange duct of the plurality fixed exchange ducts includes openings at a first longitudinal end and a second, opposing longitudinal end. The device further includes a rotating valve assembly positioned within the housing for directing flow to and from the plurality of exchange ducts. The rotating valve assembly includes a first valve positioned at the first longitudinal end of the plurality of exchange ducts. The first valve includes a plurality of openings configured to be in selective communication with each exchange duct of the plurality of exchange ducts. The rotating valve assembly further includes a second valve positioned at the second longitudinal end of the plurality of exchange ducts. The second valve includes a plurality of openings configured to be in selective communication with each exchange duct of the plurality of exchange ducts. At least one opening of the plurality of openings of the first valve that is at least partially aligned with a corresponding opening of the plurality of openings of the second valve in a direction along the longitudinal axis of the housing may be angularly offset from the corresponding opening of the second valve.

In yet additional embodiments, the present disclosure includes a method of exchanging pressure between fluid streams. The method includes supplying a relatively high-pressure fluid into a first port formed in a first end of a housing of a pressure exchanger, supplying a relatively low-pressure fluid into another a second port formed in a second, opposing end of the housing of the pressure exchanger, rotating a valve element including a first valve positioned on a first end of a plurality of stationary ducts extending along a longitudinal axis of the pressure exchanger and a second valve positioned on a second, opposing end of the plurality of stationary ducts about the plurality of stationary ducts, transferring the relatively high-pressure fluid from the first port and into at least one duct of the plurality of stationary ducts with the first valve, transferring the relatively low-pressure fluid from the second port and into at least one duct of the plurality of stationary ducts with the second valve, pressurizing the relatively low-pressure fluid with the relatively high-pressure fluid to form a pressurized fluid and a spent fluid, transferring the pressurized fluid from the at least one duct of the plurality of stationary ducts with the second valve and outputting the pressurized fluid from the pressure exchanger through a third port formed in the second end of the housing, and transferring the spent fluid from the at least one duct of the plurality of stationary ducts with the first valve and outputting the spent fluid from the pressure exchanger through a fourth port formed in the first end of the housing.

In yet additional embodiments, the present disclosure includes a method of exchanging pressure between fluid streams. The method includes supplying a relatively high-pressure super saline solution into a pressure exchanger from a reverse osmosis device through a first port in a first end of a housing of the pressure exchanger, supplying a relatively low-pressure saline solution into the pressure exchanger through a second port in a second, opposing end of the housing, pressurizing the relatively low-pressure saline solution with the relatively high-pressure super saline solution to form a pressurized saline solution and a spent super saline solution, transferring the pressurized saline solution from the pressure exchanger through a third port formed in the second end of the housing, and transferring the spent super saline solution from the pressure exchanger through a fourth port formed in the first end of the housing.

DETAILED DESCRIPTION

The illustrations presented herein are, in some instances, not actual views of any particular device, component, structure, element, or other feature, but are merely idealized representations that are employed to describe embodiments the present disclosure. Additionally, elements common between figures may retain the same numerical designation.

Disclosed herein are fluid exchange devices that may be utilized to exchange one or more properties between fluids (e.g., a pressure exchanger).

In some embodiments, exchangers as disclosed herein may be similar to and include the various components and configurations of the pressure exchangers disclosed in United States Patent Application Publication US 2009/0185917 to Andrews, published Jul. 23, 2009, the disclosure of which is hereby incorporated herein in its entirety by this reference.

Although some embodiments of the present disclosure are depicted as being used and employed as a pressure exchanger between two or more fluids, persons of ordinary skill in the art will understand that the embodiments of the present disclosure may be employed in other implementations such as, for example, the exchange of other properties (e.g., temperature, density, etc.) between one or more fluids and/or mixing of two or more fluids.

Figure 1:
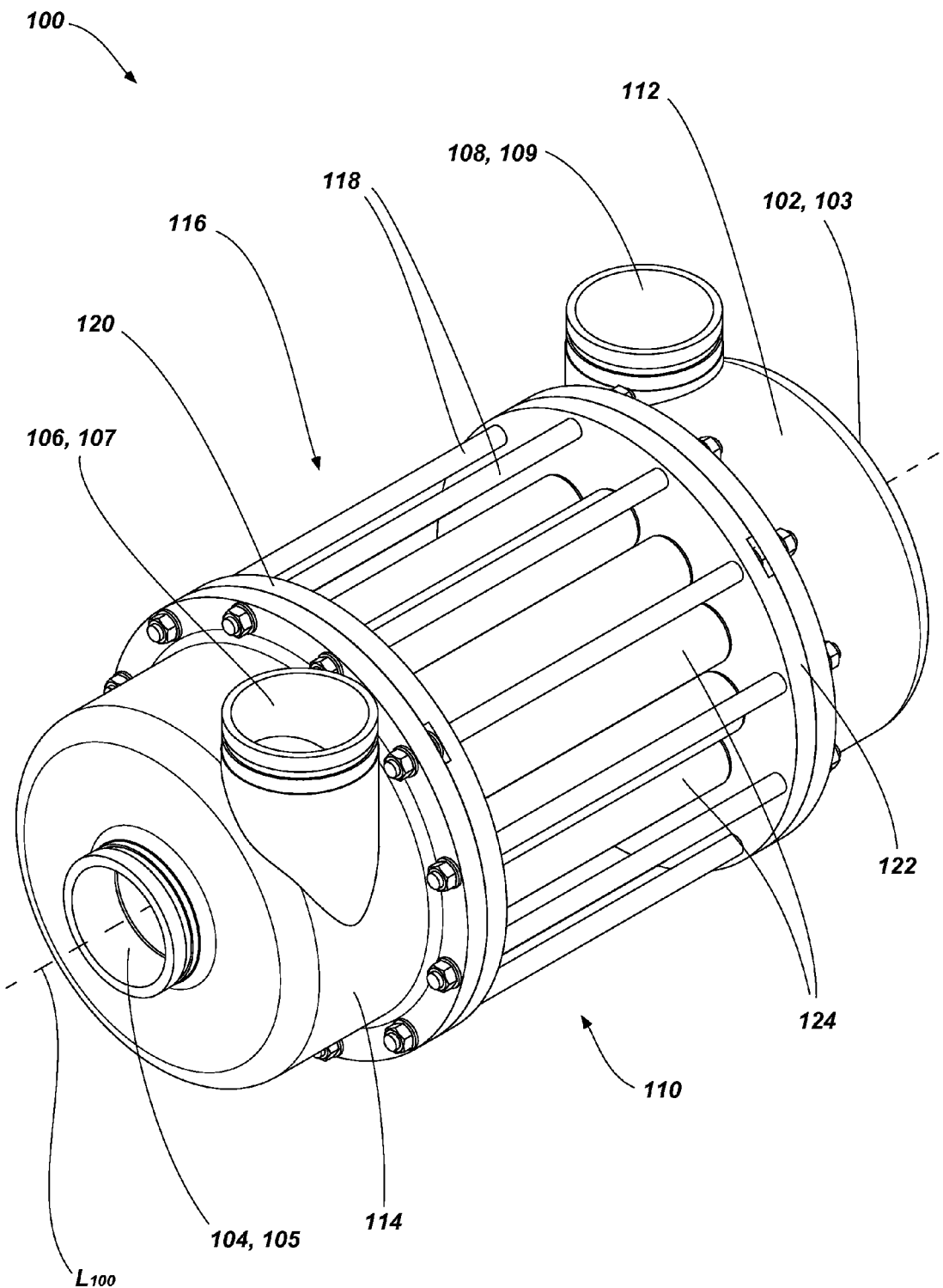
FIG. 1 is a perspective view of an embodiment of an exchange device (e.g., a pressure exchanger) in accordance with an embodiment of the disclosure.
Figure 2:
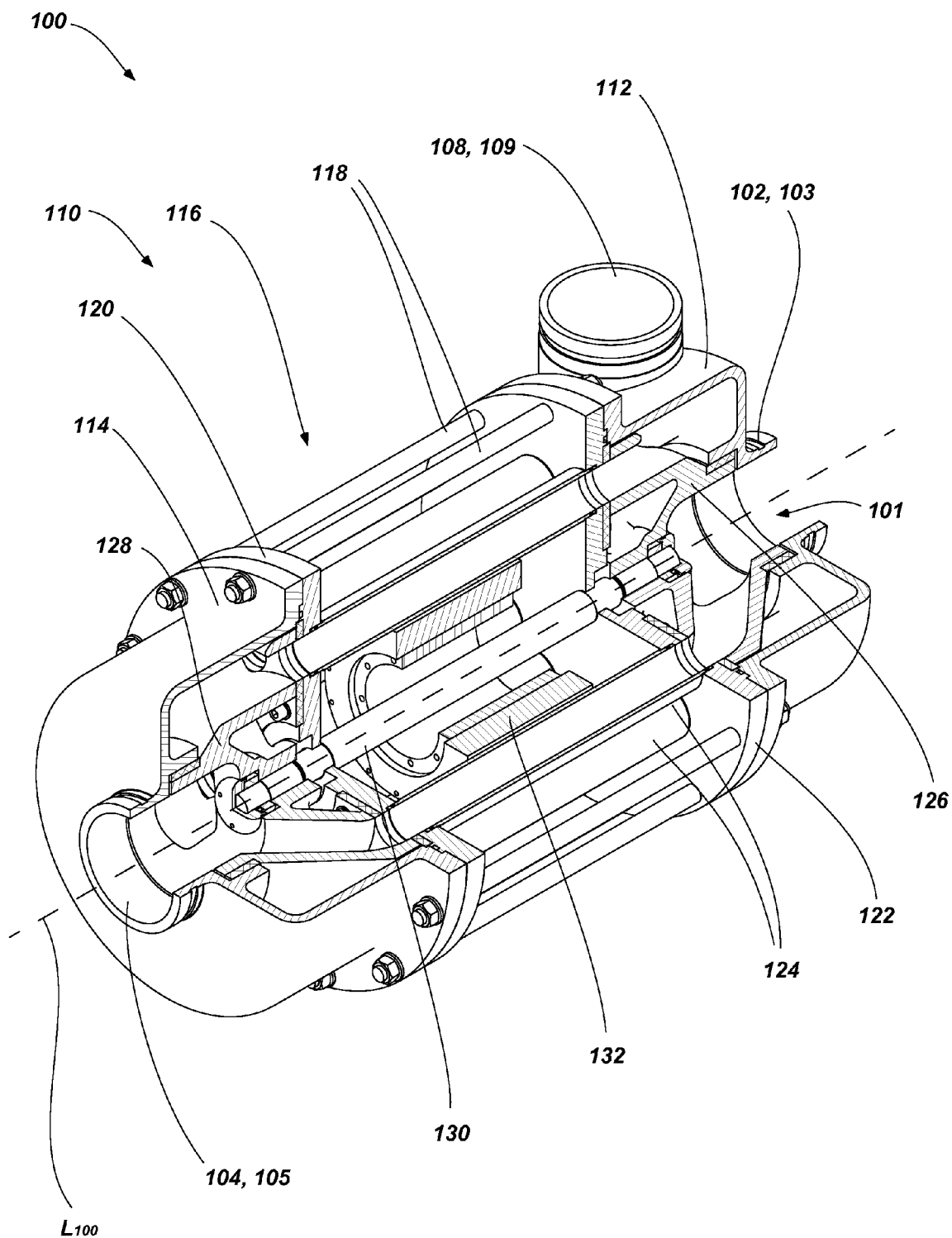
FIG. 2 is a perspective view of the pressure exchanger of FIG. 1 with a portion of the exchanger being cutaway.

FIG. 1 is a perspective view of an embodiment of an exchange device (e.g., a pressure exchanger 100) and FIG. 2 is another perspective view of the pressure exchanger 100 of FIG. 1 including a cutaway portion. As shown in FIGS. 1 and 2, the pressure exchanger 100 may include a plurality of ports (e.g., four) for supplying fluid to and removing fluid from the pressure exchanger 100. For example, the pressure exchanger 100 may include a first port 102 (e.g., acting as a high-pressure inlet (HPI) 103) of a first stream and a second port 104 (e.g., acting as a high-pressure outlet (HPO) 105). The pressure exchanger 100 may also include a third port 106 (e.g., acting as a low-pressure inlet (LPI) 107) of a second stream and a fourth port 104 (e.g., acting as a low-pressure outlet (LPO) 109).

As depicted, the pressure exchanger 100 is configured to enable high-pressure fluid to enter and leave the pressure exchanger 100 (e.g., through ports 102, 104) along the center of the pressure exchanger 100 (e.g., along a longitudinal axis $L_{100}$ or centerline of the pressure exchanger 100) while low-pressure fluid enters and leaves the pressure exchanger 100 (e.g., through ports 106, 108) in a direction transverse to the longitudinal axis $L_{100}$ or centerline of the pressure exchanger 100 (e.g., tangential to the rotation of the valve assembly, discussed below, in the pressure exchanger 100). In other embodiments, the pressure exchanger 100 may be configured to enable low-pressure fluid to enter and leave the pressure exchanger 100 (e.g., through ports 102, 104) along the center of the pressure exchanger 100 (e.g., along the longitudinal axis $L_{100}$ or centerline of the pressure exchanger 100) while high-pressure fluid enters and leaves the pressure exchanger 100 (e.g., through ports 106, 108) in a direction transverse to the longitudinal axis $L_{100}$ or centerline of the pressure exchanger 100 (e.g., tangential to the rotation of the valve assembly, discussed below, in the pressure exchanger 100).

The pressure exchanger 100 includes housing 110 forming the plurality of ports 102, 104, 106, 108. For example, the housing 110 of the pressure exchanger 100 may include end caps (e.g., a first end cap 112 and a second end cap 114) having one or more ports formed therein. In some embodiments, each end cap 112, 114 may include two ports. For example, the first end cap 112 may include the first port 102 and the fourth port 108 and the second end cap 114 may include the second port 104 and the third port 106. In other words, the first end cap 112 may include the HPI 103 and the LPO 109 and the second end cap 114 may include the HPO 105 and the LPI 107.

In some embodiments, the end caps 112, 114 may be formed such that the first port 102 and the second port 104 (e.g., the HPI 103 and the HPO 105) are aligned with an axis of the pressure exchanger 100 (e.g., the longitudinal axis $L_{100}$ or centerline). In other words, the end caps 112, 114 may enable fluid flow (e.g., high-pressure fluid flow) through the first port 102 and the second port 104 in an axial direction. The end caps 112, 114 may be formed such that the third port 106 and the fourth port 108 (e.g., the LPI 107 and the LPO 109) are aligned transverse to (e.g., perpendicular to) an axis of the pressure exchanger 100 (e.g., the longitudinal axis $L_{100}$ or centerline). In other words, the end caps 112, 114 may enable fluid flow through the first port 102 and the second port 104 in a radial direction.

In some embodiments, the end caps 112, 114 may be somewhat similar (e.g., identical) and include similar components. For example, the end caps 112, 114 may be mirror images of one another to facilitate flow therethrough. In other words, ports 106, 108 of the end caps 112, 114 may be positioned such that rotation of a valve therein tends to draw fluid in through the port 106, 108 or push fluid out through the port 106, 108). In such embodiments, the tangential orientation of the ports 106, 108 may enable a valve assembly (e.g., valve assembly 101 discussed below in greater detail) to be rotated by fluid flow (see, e.g., FIG. 9) through the ports 106, 108.

The housing 110 of the pressure exchanger 100 includes a middle portion 116 extending between the end caps 112, 114. For example, each end cap 112, 114 may be coupled to the middle portion 116 on opposing axial ends of the middle portion 116. In some embodiments, the end caps 112, 114 may be coupled with rods 118 fastened at both ends of the middle portion 116. In other embodiments, the end caps 112, 114 may be coupled directly to the middle portion 116 as shown and described below with reference to FIG. 12. The end caps 112, 114 may be abutted with plates (e.g., a first plate 120 and a second plate 122) on either end of the middle portion 116. For example, each end cap 112, 114 may be abutted with a plate 120, 122 on each axial end of the pressure exchanger 100 and secured with the rods 118.

The middle portion 116 includes a plurality of ducts 124 for exchanging pressure and/or fluid between fluids supplied to the pressure exchanger 100 through the ports 102, 104, 106, 108. For example, the ducts 124 may extend along the longitudinal axis $L_{100}$ of the pressure exchanger 100 between the plates 120, 122. Each plate 120, 122 may be formed as a duct holder having a plurality of apertures formed in the plate 120, 122, where each aperture in the plate 120, 122 is in communication with a respective duct 124, to enable fluid communication between the ports 102, 104, 106, 108 in the end caps 112, 114 and the ducts 124. In some embodiments, and as shown in FIG. 2, the ducts 124 may be formed by separate tubes of the middle portion 116 of the housing 110. In other embodiments, the ducts 124 may be formed in a unitary middle housing as shown in and described with reference to FIG. 12.

As best shown in FIG. 2, the pressure assembly 100 includes a valve assembly (e.g., valve assembly 101 discussed below in greater detail) that rotates about the fixed ducts 124. In other words, while the valve assembly 101 may rotate relative to the ducts 124, the housing 110 of the pressure assembly 100 is configured to hold the ducts 124 stationary while the valve assembly 101 rotates about the ducts 124. In other embodiments, the pressure exchanger 100 may include a valve assembly 201 similar to that discuss below with reference to FIG. 8.

The valve assembly 101 includes one or more valves (e.g., a first valve 126 and a second valve 128) that are positioned on opposing sides of the ducts 124 to regulate fluid flow between the ports 102, 104, 106, 108 in the end caps 112, 114 and the ducts 124. For example, the valves 126, 128 may be rotatably mounted within the end caps 112, 114 and configured for selective communication with the ducts 124 of the middle portion 116. In some embodiments, and as discuss below in greater detail, the valves 126, 128 may be positioned (e.g., fixed to the shaft 130) at an angular offset relative to each other to provide a phase shift. In some embodiments, the valves 126, 128 may comprise a metal, a metal alloy (e.g., stainless steel), a polymer (e.g., a thermoplastic), a ceramic, or combinations thereof.

Figure 9:
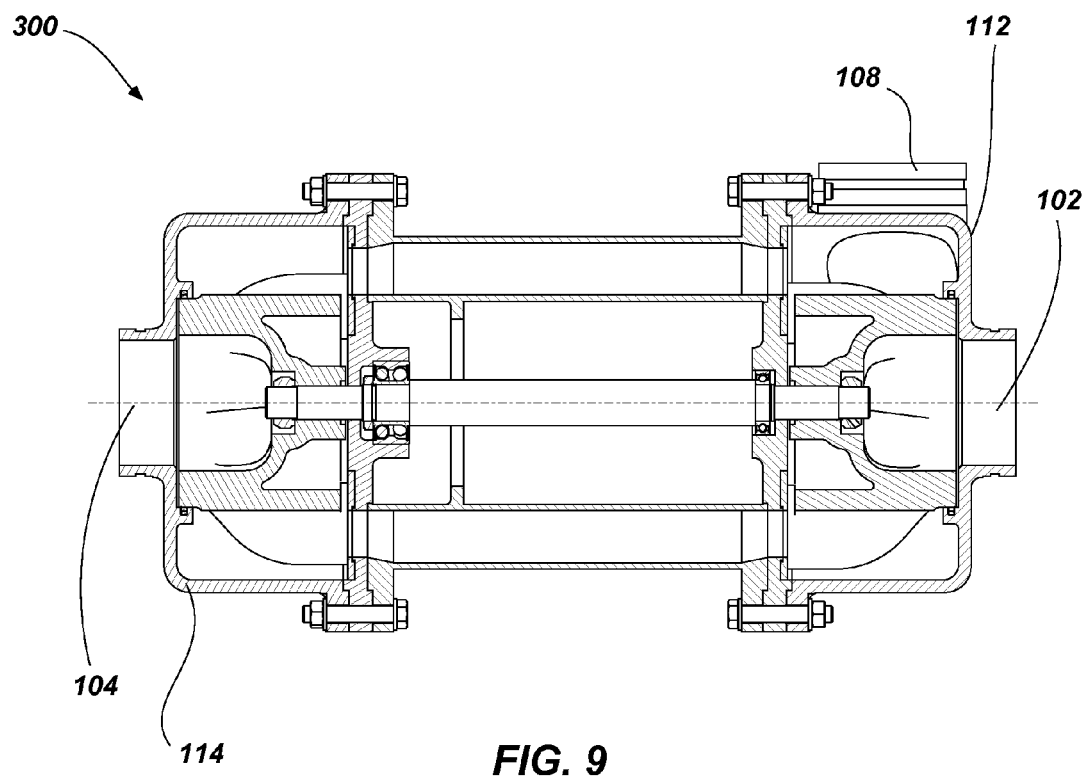
FIG. 9 is a cross-sectional view of an embodiment of a pressure exchanger in accordance with another embodiment of the disclosure.

The valves 126, 128 may be coupled to the middle portion 116 (e.g., in sealing and sliding engagement with the plates 120, 122) with a shaft 130. For example, the shaft 130 may be coupled to and extend from the first valve 126, extend through the middle portion 116 of the housing 110 (e.g., along the longitudinal axis $L_{100}$ of the pressure exchanger 100), and extend and be coupled to the second valve 128. In order for the valves 126, 128 to rotated relative to the middle portion 116 (e.g., relative to the ducts 124), the valves 126, 128 may rotate about the shaft 130, the valves 126, 128 and the shaft 130 may rotate relative to one or more portions of the pressure exchanger 100 (e.g., the ducts 124), or combinations thereof. In some embodiments, the pressure exchanger 100 may include a motor 132 (e.g., an electric motor) for rotating the valves 126, 128 and the shaft 130. In other embodiments, and as shown in FIG. 9, the pressure exchanger 300 may lack a motor 132 and the valves 126, 128, and, in some embodiments, the shaft 130 may, be configured for rotation powered by the fluid flow supplied to the pressure exchanger 300 via the ports 102, 104, 106 (not depicted in FIG. 9, see FIG. 1), 108 in the end caps 112, 114. In yet other embodiments, the motor may comprise a hydraulic motor.

Figure 3:
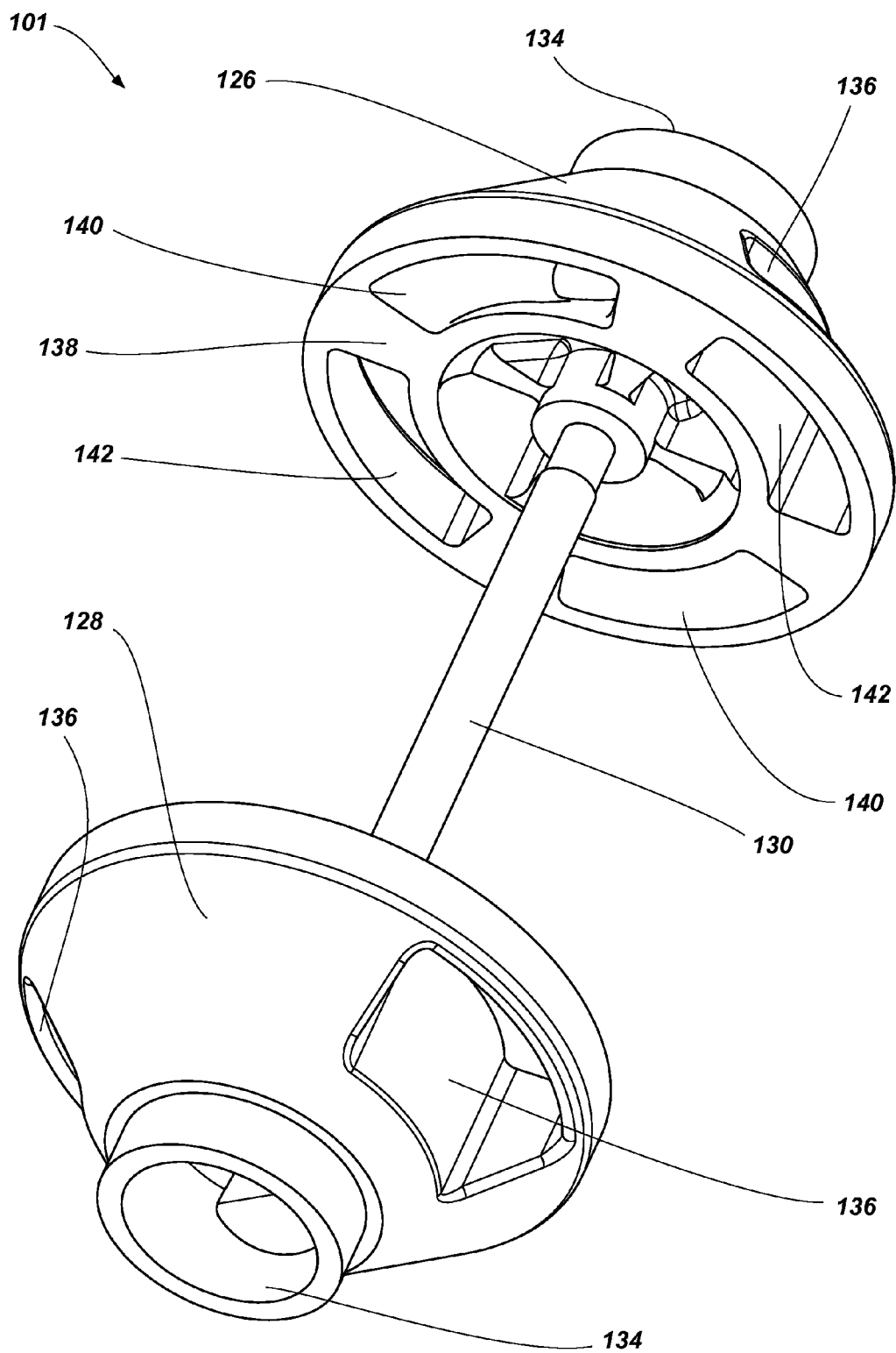
FIG. 3 is a perspective view of an embodiment of valve assembly such as, for example, the valve assembly of the pressure exchanger of FIGS. 1 and 2.

FIG. 3 is a perspective view of the valve assembly 101 for use with the pressure exchanger. As shown in FIG. 3, the valve assembly 101 is formed by the valves 126, 128 and the shaft 130 as shown and discussed above with reference to FIGS. 1 and 2. In some embodiments, valves 126, 128 may be substantially similar (e.g., identical). Accordingly, as discussed herein with reference to FIG. 3, it will be understood that valves 126, 128 are substantially similar and each include the same features, although each feature may not be viewable on each valve 126, 128 as depicted in FIG. 3. In other embodiments, the valves 126, 128 may not be identical and may differ from one another to provide different flow options to and from the ducts 124 (FIG. 2).

Each of the valves 126, 128 includes an axial port 134 for directing flow to and/or from the axial ports 102, 104 of the end caps 112, 114 (FIGS. 1 and 2) and one or more radial ports 136 (e.g., two opposing ports 136). The axial ports 134 may be positioned such that an opening of the port 134 extends along a plane perpendicular to the longitudinal axis $L_{100}$ of the pressure exchanger 100 (FIGS. 1 and 2). The radial ports 136 may be positioned such that an opening of the port 136 extends along a plane that is parallel to or forms an oblique angle with the longitudinal axis $L_{100}$ of the pressure exchanger 100 (FIGS. 1 and 2).

The ports 134, 136 of each valve 126, 128 are in communication with one or more openings on an inner surface 138 of each valve 126, 128 that provide selective fluid communication with the ducts 124 (FIG. 2). For example, the axial port 134 of each valve 126, 128 may be in communication with two opposing openings 140 (e.g., the flow path from port 134 may be divided into communication with the two openings 140). For example, each axial port 134 may extend substantially along (e.g., entirely along) the longitudinal axis $L_{100}$ of the pressure exchanger 100 (FIGS. 1 and 2) to an associated opening 140 at the inner surface 138 of the valve 126, 128. The radial ports 136 of each valve 126, 128 may be in communication with openings 142. For example, each radial port 136 may extend at least partially along the longitudinal axis $L_{100}$ of the pressure exchanger 100 (FIGS. 1 and 2) to an associated opening 142 at the inner surface 138 of the valve 126, 128. In embodiments where the radial portions 136 oppose each other (as depicted in FIG. 3), the openings 142 will also oppose each other.

Figure 4:
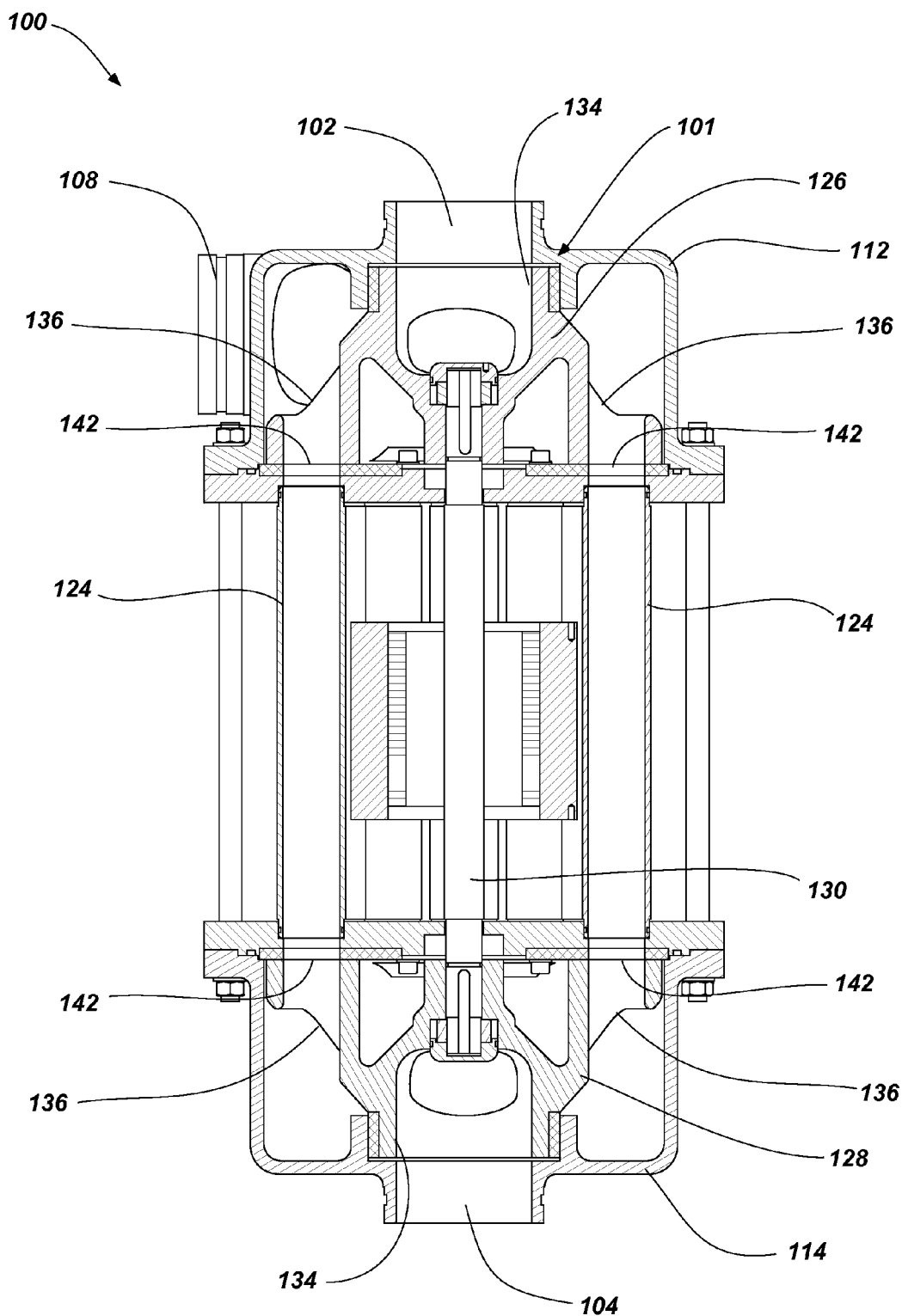
FIG. 4 is a cross-sectional view of the pressure exchanger of FIGS. 1 and 2 illustrating a flow path of the radial ports of the valve assembly.

FIG. 4 is a cross-sectional view of the pressure exchanger 100 of FIGS. 1 and 2 illustrating a flow path of the radial ports 136 of the valve assembly 101. As shown in FIG. 4, the valve assembly 101 including the valves 126, 128 is rotated such that at least of portion of the radial ports 136 of each valve 126, 128 are in communication with one or more ducts 124 of the pressure exchanger 100. For example, the openings 142 in communication with the radial ports 136 of each valve 126, 128 may be sized such that each radial port 136 is in communication with multiple adjacent ducts 124 (e.g., at least two ducts 124, at least two ducts 124, etc.). The valve assembly 101 may enable the one or more ducts 124 of the pressure exchanger 100 that are in communication with the radial ports 136 of each valve 126, 128 to be in communication with the radial ports 136 while being isolated from the axial ports 134 of the each valve 126, 128.

As also depicted in FIG. 4, the radial ports 136 of each valve 126, 128 are in communication with a port in the end caps 112, 114 (e.g., ports 106, 108). As mentioned above, in some embodiments, the valves 126, 128 and the end caps 112, 114 may be similar or identical. Accordingly, port 106 (FIG. 1), which is not viewable in FIG. 4, may be similar to port 108. For example, the valves 126, 128 enable fluid to pass into a cavity formed by the end cap 114 via port 106 (FIG. 1) to substantially surround the valve 128. The fluid may then pass through the radial ports 136 of the valve 128, exit the valve 128 through the openings 142 in the valve 128, and pass into one or more ducts 124. Similarly, fluid, which may be the same fluid supplied through port 106 (FIG. 1) or a different fluid, may pass from the one or more ducts 124 through the openings 142 in the valve 126, through the radial ports 136 of the valve 126 into a cavity formed in the end cap 112, and may exit through a port of the pressure exchanger 100 (e.g., port 108).

Figure 5:
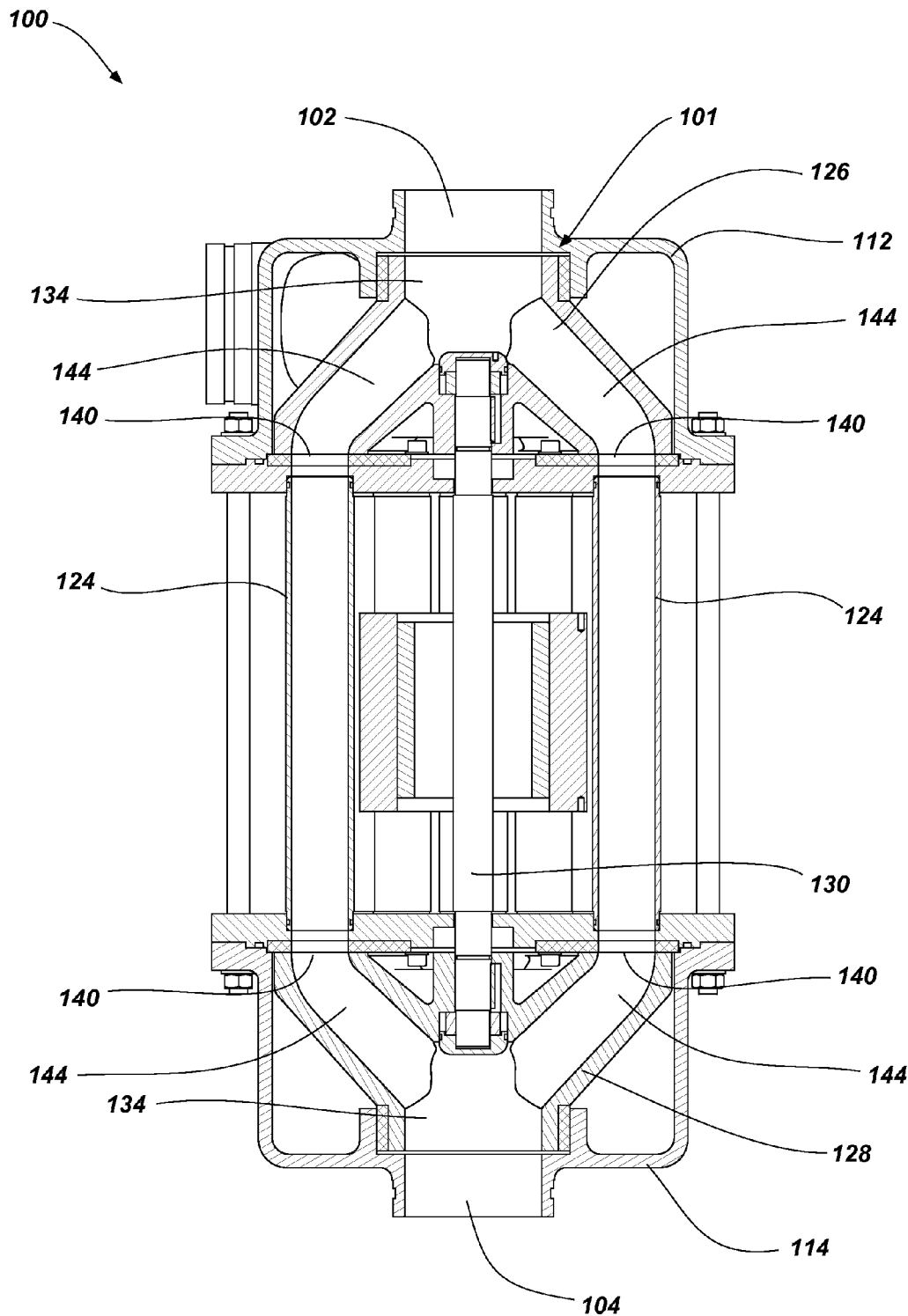
FIG. 5 is a cross-sectional view of the pressure exchanger of FIGS. 1 and 2 illustrating a flow path of the axial ports of the valve assembly taken through a cross-sectional plane perpendicular to the cross-sectional plane of FIG. 4.

FIG. 5 is a cross-sectional view of the pressure exchanger 100 of FIGS. 1 and 2 illustrating a flow path of the axial ports 134 of the valve assembly 101 taken through a cross-sectional plane perpendicular to the cross-sectional plane of FIG. 4. As shown in FIG. 5, the valve assembly 101 including valves 126, 128 is rotated such that at least of portion of the axial port 134 of each valve 126, 128 is in communication with one or more ducts 124 of the pressure exchanger 100. For example, the openings 140 in communication with the axial ports 134 of each valve 126, 128 may be sized such that each radial port 136 is in communication with multiple adjacent ducts 124 (e.g., at least two ducts 124, at least two ducts 124, etc.). As above, the valve assembly 101 may enable the one or more ducts 124 of the pressure exchanger 100 that are in communication with the axial ports 134 of each valve 126, 128 to be in communication with the axial ports 134 while being isolated from the radial ports 136 (FIG. 4) of the each valve 126, 128 and the cavities within the end caps 112, 114.

The axial ports 134 of each valve 126, 128 are in communication with a port in the end caps 112, 114 (e.g., ports 102, 104). For example, the valves 126, 128 may enable fluid to pass through the port 102 in the end cap 112 and through the axial ports 134 of valve 126. As also depicted in FIG. 5, the axial ports 134 of the valves 126, 128 may distribute the fluid flow (e.g., split) into different channels 144. The fluid may then exit the valve 126 through the openings 140 in the valve 126 and pass into one or more ducts 124. Similarly, fluid, which may be the same fluid supplied through port 102 or a different fluid, may pass from the one or more ducts 124 through the openings 140 in the valve 128, through the axial port 134 of the valve 128, and may exit through a port of the pressure exchanger 100 (e.g., port 104).

Figure 6:
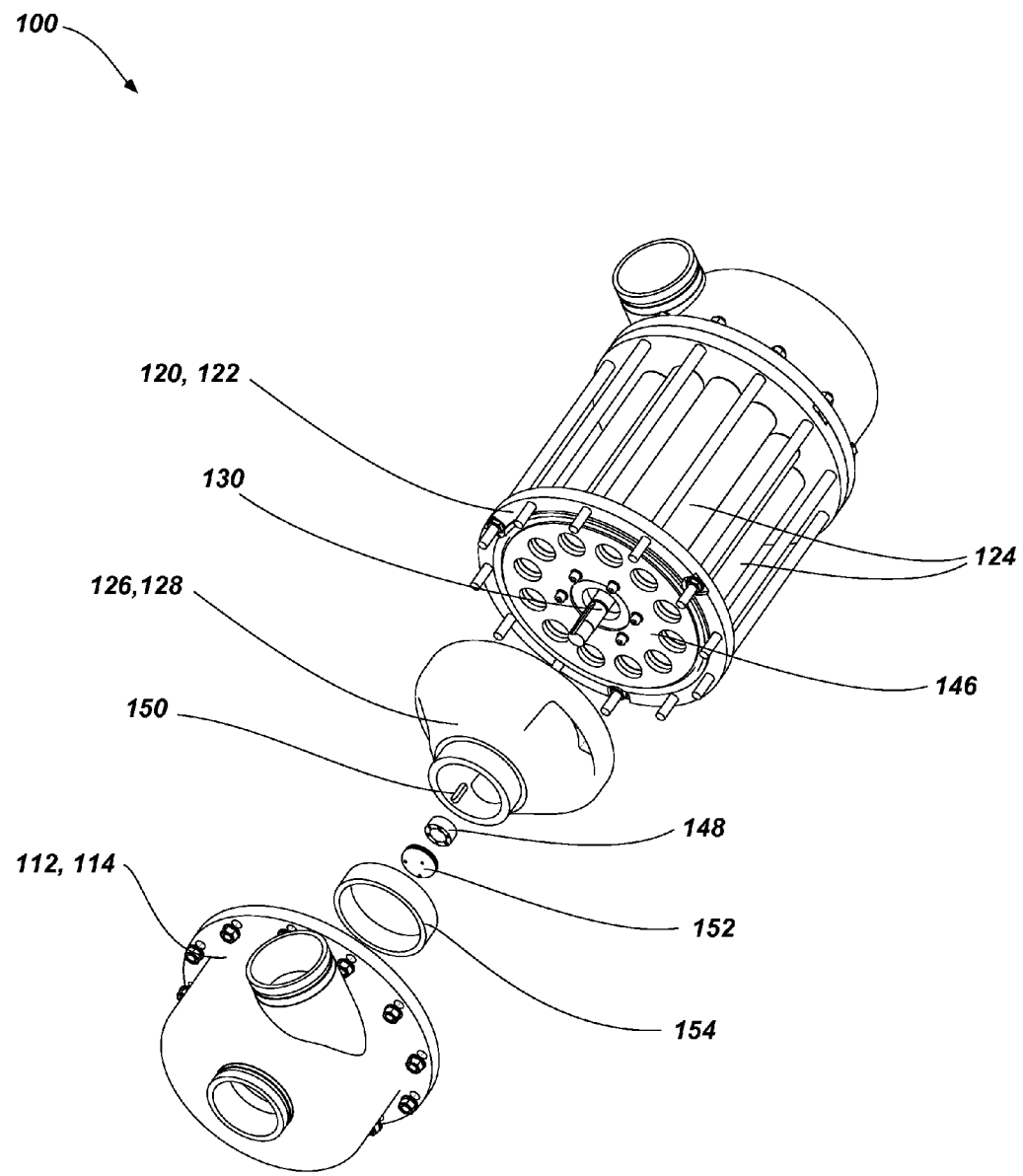
FIG. 6 is a partial, exploded perspective view of the pressure exchanger of FIGS. 1 and 2.

FIG. 6 is a partial, exploded a perspective view of the pressure exchanger 100 of FIGS. 1 and 2. As mentioned above, in some embodiments, portions of the pressure exchanger may be similar or identical. Accordingly, in one embodiment, the exploded portion of the pressure exchanger 100 shown in FIG. 6 may comprise either end portion of the pressure exchanger 100. As shown in FIG. 6, a plate is shown that may be either plate 120 or plate 122 of the middle portion 116 of the pressure exchanger 110. The middle portion 116 of the pressure exchanger 110 may include a sealing plate 146 positioned between the plate 120, 122 and the respective valve 126, 128. The sealing plate 146 may form a seal (i.e., an axial seal) between the valve 126, 128 and the middle portion 116 including the ducts 124 enabling the valve 126, 128 to rotate relative to the stationary ducts 124 while minimizing fluid leakage between these components. In other words, the sealing plate 146 forms a dynamic seal with the valve 126, 128 as the valve 126, 128 slides along the sealing plate 146. In some embodiments, the sealing plate 146 may comprise a metal, a metal alloy (e.g., stainless steel), a polymer (e.g., a thermoplastic such as polyether ether ketone (PEEK), a composite thermoplastic such as a polymer including fibers formed therein, or combinations thereof), a ceramic, or combinations thereof.

In some embodiments, the valves 126, 128 may be secured to shaft 130 with an axial shaft nut 148 and key 150 that is received within complementary slot formed in the shaft 130 and the axial shaft nut 148. The ends of the shaft 130 may be covered with a sealing nut 152 to minimize leakage from the ports of the valves 126, 128 and/or to at least partially prevent unintended loosening of the axial shaft nut 148 (e.g., configured as a jam nut). In some embodiments, the coupling of the valves 126, 128 to the shaft 130 may be adjustable along the length of the shaft 130 to adjust the interface between the valves 126, 128 and sealing plate 146. In other words, the coupling of the valves 126, 128 to the shaft 130 may be adjustable (e.g., via tightening and loosening of the axial shaft nuts 148) to ensure that the valves 126, 128 are adequately forming a dynamic seal with the sealing plate 146 while still being able to rotate relative to the sealing plate 146. In some embodiments, the valves 126, 128 may be positioned to provide a selected gap (e.g., a fixed sealing gap of, for example, 0.002 mm) between each sealing plate 146 and an associated valve 126, 128 that rotates thereover. In other embodiments, the valves 126, 128 and the sealing plate 146 may be in contact with one another.

In yet other embodiments, the valves 126, 128 may be secured to the shaft 130 to provide a self-adjustable gap between each sealing plate 146 and an associated valve 126, 128 that rotates thereover. In other words, the valves assembly 101 may move axially in the pressure exchanger 100 relative to at least a portion of the pressure exchanger 100 (e.g., the housing 110). In such an embodiment, pressure from fluid flow through the pressure exchanger 100 (e.g., through the valve assembly 101) may self-adjust the position of the valve assembly 101 within the pressure exchanger 100. In yet other embodiments, the valves 126, 128 may be biased (e.g., with springs, torque nuts, etc.) into sealing engagement with the sealing plates 146. In yet other embodiments, the valves 126, 128 may float axially on the shaft 130, with the axial shaft nut 148 stopping the valve 126, 128 when moving away from the sealing plate 146 and enabling the valves 126, 128 to move toward the plates 146.

Figure 14:
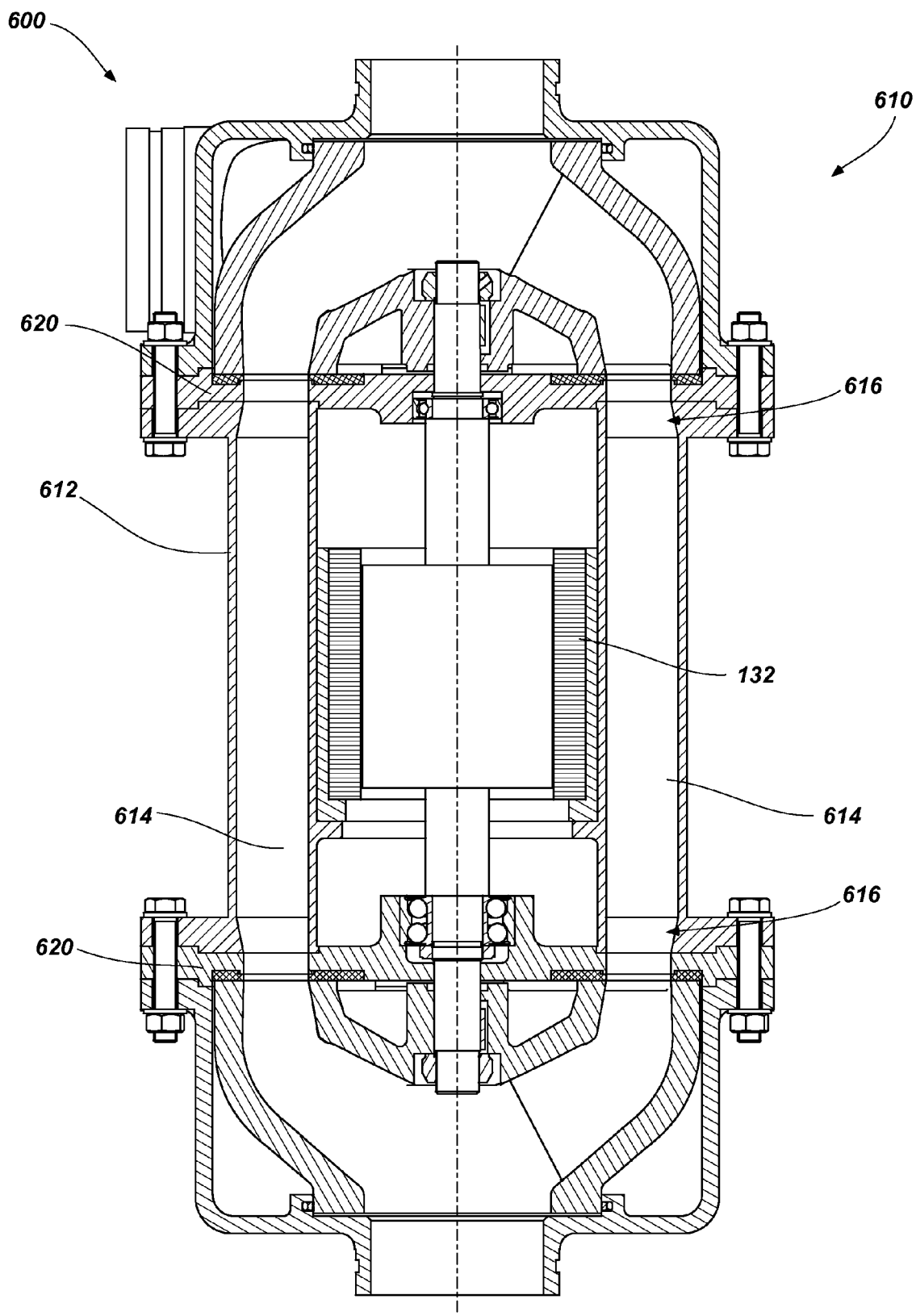
FIG. 14 is another cross-sectional view of the pressure exchanger of FIG. 12.

The pressure exchanger 100 may include a sleeve bearing 154 that may be coupled to (e.g., positioned over, formed integrally with, etc.) a portion of the valve 126, 128. The sleeve bearing 154 forms a seal (e.g., a dynamic radial seal) between the valves 126, 128 and a portion of the end caps 112, 114. In some embodiments, the sleeve bearing 154 may comprise an O-ring (e.g., as shown in FIG. 14), lip seal, or other energized seal configured to create a dynamic seal between the valves 126, 128 and a portion of the end caps 112, 114. In some embodiments, the sealing plate 146 and sleeve bearing 154 may comprise a metal, a metal alloy (e.g., stainless steel), a polymer (e.g., a composite thermoplastic, polytetrafluoroethylene (PTFE), etc.), a ceramic, or combinations thereof.

Figure 7:
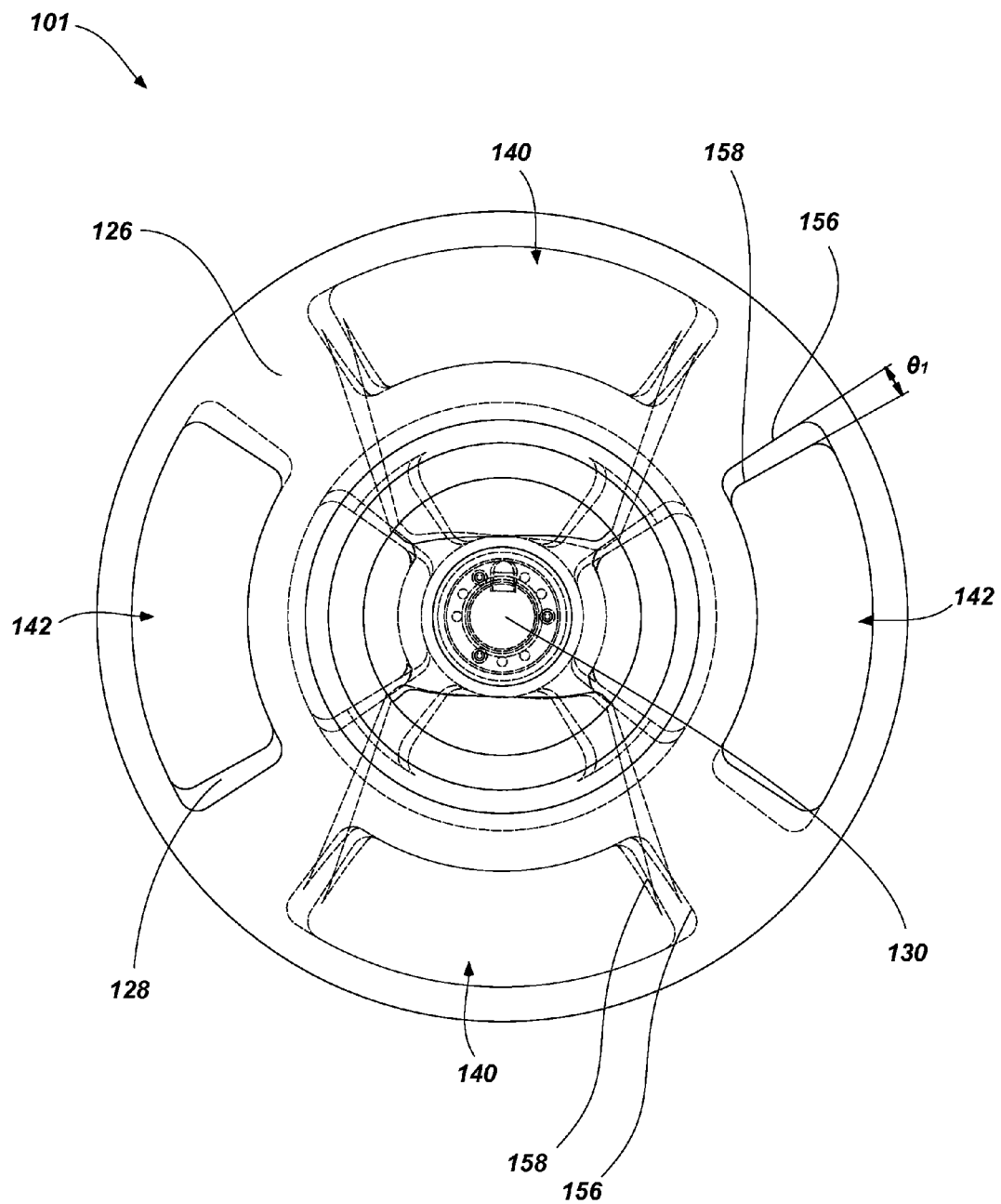
FIG. 7 is a top view of an embodiment of valve assembly such as, for example, the valve assembly of the pressure exchanger of FIGS. 1 and 2.

FIG. 7 is a top view of an embodiment of valve assembly such as, for example, the valve assembly 101 of the pressure exchanger 100 of FIG. 2. Both valves 126, 128 of the valve assembly 101 are shown in FIG. 7 with the portions of the valves 126, 128 that are behind other portions of the valve assembly 101 being shown in dashed lines for clarity. As shown in FIG. 7, the valves 126, 128 may be substantially similar (e.g., identical) and may be angularly offset from one another. For example, the valves 126, 128 may be attached to the shaft 130 such that one valve 126 is at a different angular position than the other valve 128. For example, the first valve 126 may be angularly offset an angular distance $\theta_1$ (e.g., −45 degrees to 45 degrees) from the second valve 128. Such an offset will also offset the openings 140, 142 formed in the inner surface 138 (FIG. 3) of each valve 126, 128. In some embodiments, the first valve 126 may be angularly offset a positive distance $\theta_1$ (e.g., 0.01 degree to 10 degrees, 4 degrees, etc.) from the second valve 128 such that each opening 140, 142 of the first valve 126 rotationally leads, in a direction of intended valve 126, 128 rotation, a corresponding opening 140, 142 of the second valve 128 (e.g., an opening 140, 142 of the second valve 128 that is at least partially aligned with opening 140, 142 of the first valve 126 in a direction along the longitudinal axis $L_{100}$ (FIGS. 1 and 2)). In some embodiments, the first valve 126 may be angularly offset a negative distance $\theta_1$ (e.g., −10 degrees to −0.01 degree, −4 degrees, etc.) from the second valve 128 such that each opening 140, 142 of the first valve 126 rotationally trails, in a direction of intended valve 126, 128 rotation, a corresponding opening 140, 142 of the second valve 128.

As depicted in FIG. 7, a rotationally leading edge 156 of one or more openings 140, 142 in the first valve 126 may be offset from a rotationally leading edge 158 of one or more openings 140, 142 in the second valve 128. Stated in another way, in a direction along (e.g., parallel to) the longitudinal axis $L_{100}$ (FIGS. 1 and 2), a portion (e.g., a minor portion) of one or more openings 140, 142 in the first valve 126 may be offset from a portion (e.g., a minor portion) of one or more openings 140, 142 in the second valve 128 while another portion (e.g., a major portion) of one or more openings 140, 142 in the first valve 126 is aligned with a portion (e.g., a major portion) of one or more openings 140, 142 in the second valve 128. In some embodiments, each rotationally leading edge 156 of each opening 140, 142 in the first valve 126 may be offset from each rotationally leading edge 158 of each opening 140, 142 in the second valve 128.

Referring now to FIGS. 3 and 7, an offset between the openings 140, 142 formed in each valve 126, 128 may provide a phase shift between the valves 126, 128. In other words, the offset between the openings 140, 142 formed in each valve 126, 128 will vary the time during rotation of the valves 126, 128 when openings 140, 142 are in communication with a duct or multiple ducts 124 at either end thereof. For example, as the valves 126, 128 are rotated, opening 140 of the first valve 126 would be in communication with a selected duct 124 before the corresponding opening 140 of the second valve 128 as valve 128 is angularly offset a distance $\theta_1$ (i.e., the opening 140 of the first valve 126 rotational leads the corresponding opening 140 of the second valve 128 an angular distance $\theta_1$). As discussed below, such a configuration may be utilized to alter or create a phase shift between pressure spikes (e.g., a positive pressure peak as a low-pressure fluid and/or a low-pressure area is placed in communication with one or more ducts 124 and a negative pressure peak as the one or more ducts 124 are placed in communication with a high-pressure area and/or a high-pressure fluid) in the pressure exchanger 100 that may act to reduce the occurrence of cavitations in the pressure exchanger 100.

Figure 8:
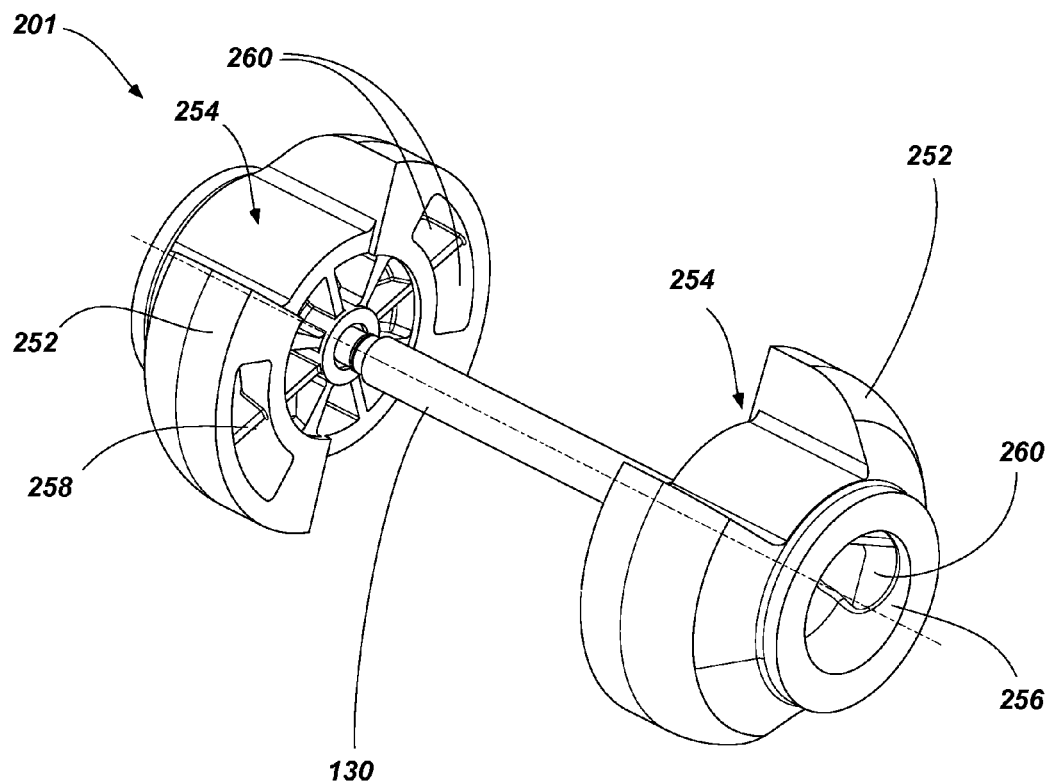
FIG. 8 is a perspective view of another embodiment of valve assembly for use with an exchanger such as, for example, the pressure exchanger of FIGS. 1 and 2.

FIG. 8 is a perspective view of another embodiment of valve assembly 201 for use with a pressure exchanger such as, for example, the pressure exchanger 100 of FIGS. 1 and 2. As shown in FIG. 8, the valve assembly 201 may be similar to the valve assembly 101 discussed above with reference to FIGS. 3, 6, and 7 and may include the same or similar components and configurations. As depicted, the valve assembly 201 may include valves 252 having a substantially butterfly-shape. For example, an outside portion of radial ports 254 of the valves 252 may not be bounded by a portion of the valves 252 (as compared to the radial ports 136 of valves 126, 128). In some embodiments, axial ports 256 of the valves 252 may include a dividers 258 between each the channels 260 extending from axial ports 256 of the valves 252.

FIG. 9 is a cross-sectional view of an embodiment of a pressure exchanger 300 lacking a motor. As discussed above, pressure exchanger 300 may lack a motor and the valves 126, 128 (and, in some embodiments, the shaft 130) may be configured for rotation powered by the fluid flow supplied to the pressure exchanger 300 via the ports 102, 104, 106 (not depicted in FIG. 9, see FIG. 1), 108 in the end caps 112, 114.

Figure 10:
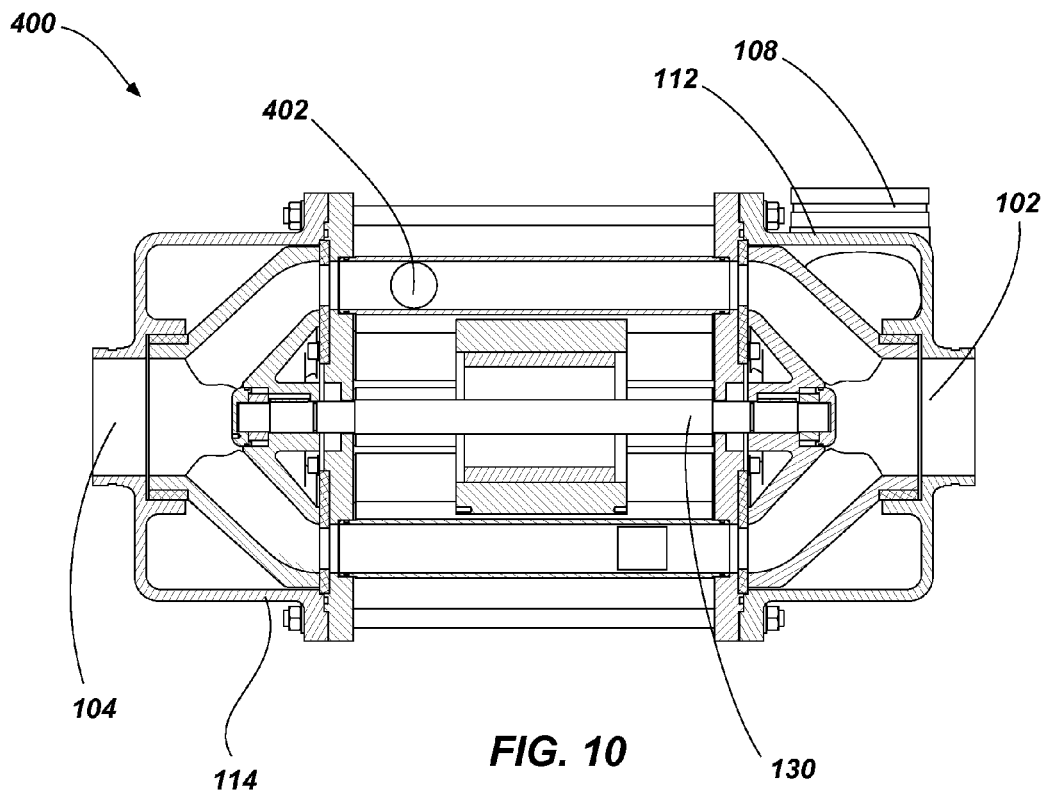
FIG. 10 is a partial cross-sectional view of an embodiment of a pressure exchanger in accordance with yet another embodiment of the disclosure.

FIG. 10 is a partial cross-sectional view of an embodiment of a pressure exchanger 400 including one or more elements for minimizing (e.g., at least substantially preventing) mixing between fluids in one or more portions of the pressure exchanger 400 (e.g., in the ducts 124). As shown in FIG. 10, the pressure exchanger 400 may include one or more duct pistons 402 positioned in the ducts 124 of the pressure exchanger 400 to minimize mixing between fluid on a first end of the pressure exchanger 400 (e.g., fluid supplied via port 102 in the end cap 112 and removed via port 108) and fluid on a second, opposing end of the pressure exchanger 400 (e.g., fluid supplied via port 106 (FIG. 1) in the end cap 114 and removed via port 104). In some embodiments, the duct pistons 402 may be shaped to exhibit a circular cross section (e.g., a ball, a sphere, a cylinder). In some embodiments, the duct pistons 402 may comprise a metal, a metal alloy (e.g., stainless steel), a polymer, a ceramic, or combinations thereof. Such duct pistons 402 may be implemented in any of the exchangers disclosed herein.

Figure 11:
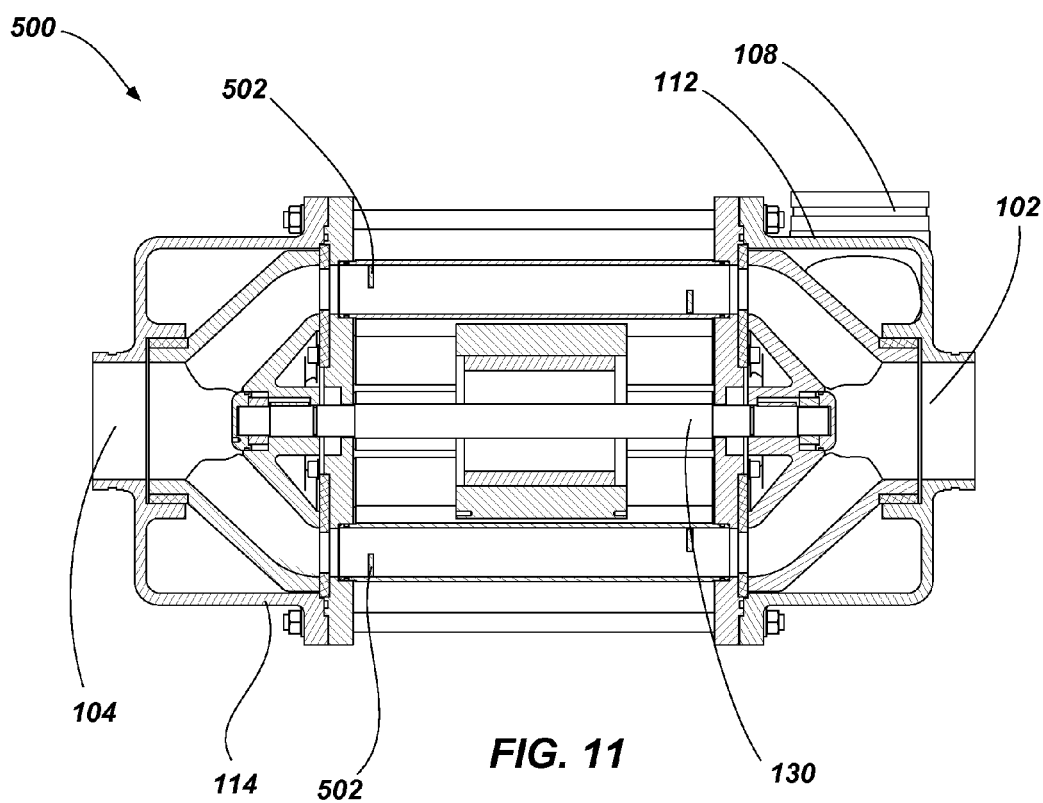
FIG. 11 is a cross-sectional view of an embodiment of a pressure exchanger in accordance with yet another embodiment of the disclosure.

FIG. 11 is a cross-sectional view of an embodiment of a pressure exchanger 500 including one or more elements for minimizing (e.g., at least substantially preventing) mixing between fluids in one or more portions of the pressure exchanger 400 (e.g., in the ducts 124). As shown in FIG. 11, the pressure exchanger 500 may include one or more baffles 502 positioned in the ducts 124 to at least partially impede flow of a fluid (e.g., a high-pressure fluid) into the duct 124. Such baffles 502 may be implemented in any of the exchangers disclosed herein.

Figure 12:
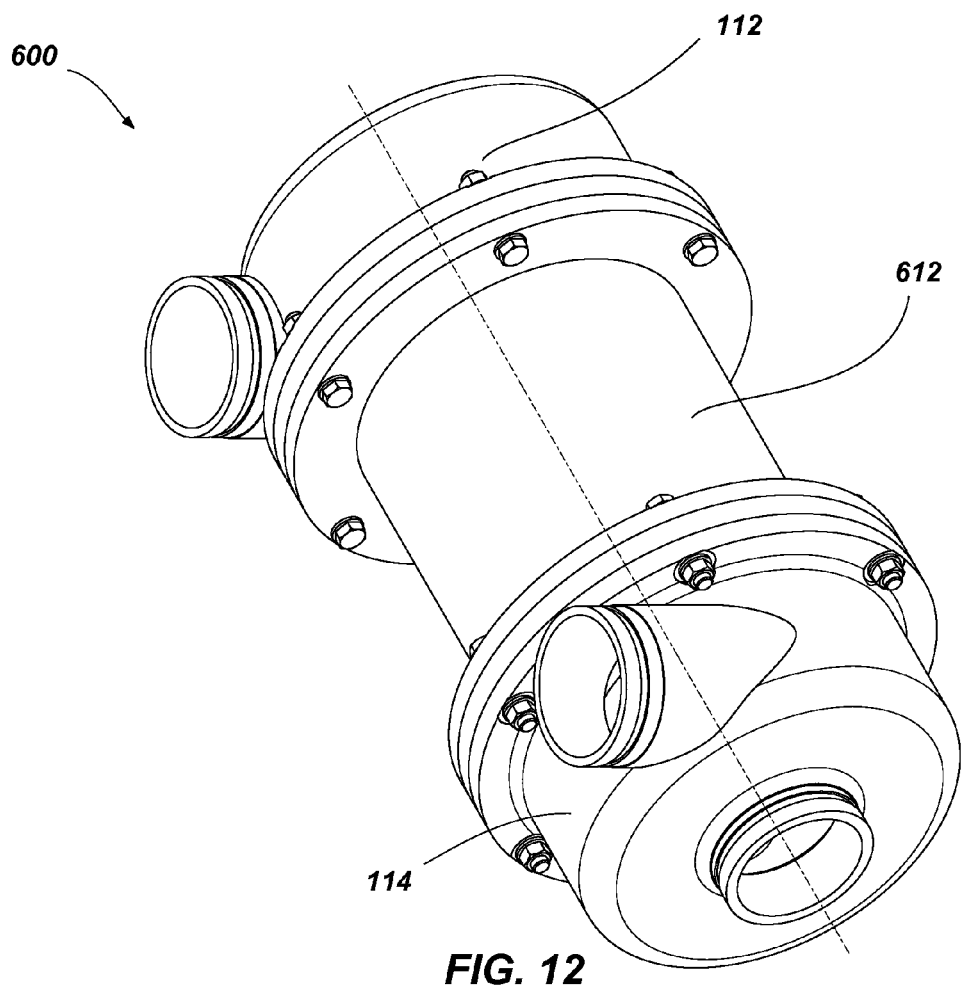
FIG. 12 is a perspective view of an embodiment of an exchange device (e.g., a pressure exchanger) in accordance with yet another embodiment of the disclosure.

FIG. 12 is a perspective view of an embodiment of an exchange device (e.g., a pressure exchanger 600). As shown in FIG. 12, the pressure exchanger may be substantially similar to the pressure exchangers 100, 300, 400, 500 discussed above with reference to FIGS. 1 through 11 and may include the same or similar components (e.g., valve assemblies 101, 201) and configurations. For example, the pressure exchanger 600 includes end caps 112, 114 that each may include two ports coupled (e.g., rigidly coupled) to an enclosed middle portion 612.

Figure 13:
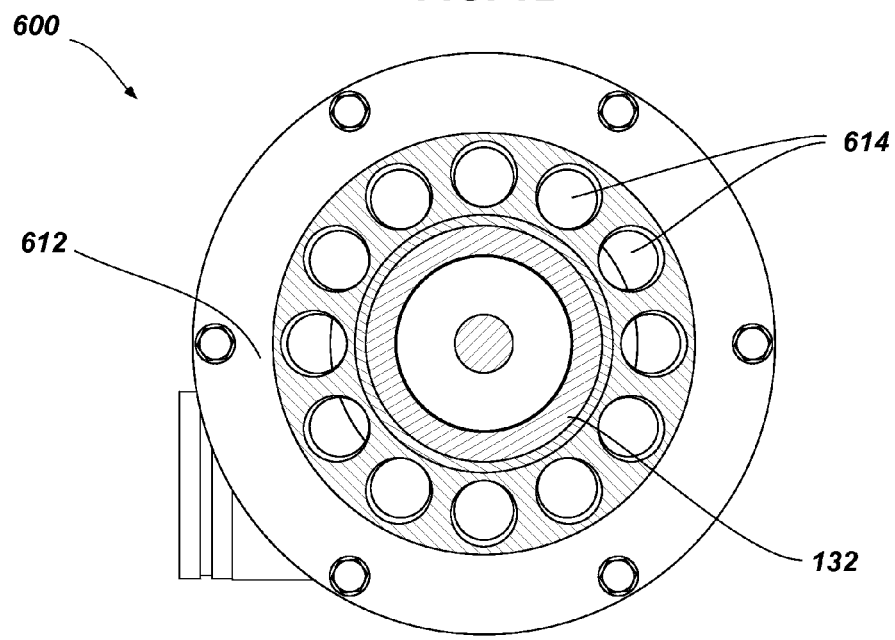
FIG. 13 is another cross-sectional view of the pressure exchanger of FIG. 12.

FIGS. 13 and 14 are cross-sectional views of the pressure exchanger 600 of FIG. 12 taken in a direction transverse to the longitudinal axis and along the longitudinal axis, respectively. As shown in FIGS. 13 and 14, the pressure exchanger 600 may include a housing 610 (e.g., a stator housing) that includes the middle portion 612. As depicted, the middle portion 612 may be a unitary structure (i.e., rather than a plurality of tubes as shown in FIG. 1) having each of the ducts 614 (e.g., twelve ducts) formed therein. The middle portion may be coupled to plates 620 that are similar to the plates 120, 122 discussed above with references to FIGS. 2 and 6. As also depicted in FIG. 14, the ducts 614 may include a necked portion 616 proximate each end of the ducts 614 having a reduced inner diameter.

In some embodiments, the stator housing 610 may be formed from a conductive material (e.g., a metallic material) or a nonconductive material (e.g., a nonmetallic material such as a nonconductive polymer). In embodiments implementing a conductive stator housing 610 and a motor 132, fluid flow through the ducts 614 may be utilized to cool the motor 132. For example, as shown in FIG. 13, the motor 132 may be directly mounted into (e.g., in direct thermal communication with) the stator housing 610.

Referring back to FIG. 5, in operation, a first fluid stream may be supplied to the pressure exchanger 100 (or pressure exchanger 300, 400, 500, 600) through port 102. It is noted that while specific reference is made to pressure exchanger 100, pressure exchangers 300, 400, 500, 600 may all operate in a similar or identical manner as described herein. Rotating valve 126 enables the fluid to pass through the axial port 134 and into the channels 144 formed in the valve 126. As the valve 126 rotates, the channels 144 are positioned in selective communication with one or more ducts 124 enabling at least a portion of the fluid to pass through openings 140 and into the ducts 124.

As further shown in FIG. 5, fluid from the ducts 124 may exit the ducts 124 (e.g., may be forced out by the fluid supplied to ducts 124 as discussed above) through rotating valve 128. For example, fluid from the ducts 124 may pass through openings 140 in the valve 128, pass through the channels 144 to axial port 134, and may exit the valve 128 and pressure exchanger 100 via port 104.

As shown in FIG. 4, a second fluid stream is supplied to the pressure exchanger 100 through port 106 (FIG. 1) (e.g., simultaneously with the first fluid stream being supplied in FIG. 5) and into the cavity within end cap 114. Rotating valve 128 enables the fluid to pass from the cavity in the end cap 144 into each radial port 136 in the valve 128. As the valve 128 rotates, the radial ports 136 are positioned in selective communication with one or more ducts 124 enabling at least a portion of the fluid to pass through openings 142 and into the ducts 124.

As further shown in FIG. 4, fluid from the ducts 124 may exit the ducts 124 (e.g., may be forced out by the fluid supplied to ducts 124 as discussed above) through rotating valve 126. For example, fluid from the ducts 124 may pass through openings 142 in the valve 126, pass through the radial ports 136, and may exit the valve 126 cavity within end cap 114 and the pressure exchanger 100 via port 108.

As discussed above with reference to FIG. 7, in some embodiments, the valves 126, 128 may be angularly offset. In such an embodiment, the offset between the valves 126, 128 may offset the communication of the first valve 126 and the second valve 128 with each duct 124. For example, and as discussed above, a portion of an opening 140, 142 of the first valve 126 may be placed in communication with a portion of a duct 124 on a first end of the duct 124 before a portion of an opening 140, 142 of the second valve 126 is placed in communication with the same duct 124 on an opposing end of the duct 124 as the valve assembly 101 rotates about the duct 124 (or vice versa depending on the angular offset selected). Such an offset will delay forces applied to the duct 124 by the fluids on either side thereof. For example, the angular offset in the valve assembly 101 will act to offset the timing between the supply of fluid through the openings 140, 142 in the first valve 126 on one end of the duct 124 and the removal of fluid from the duct 124 through the openings 140, 142 in the second valve 126 on an opposing end of the duct 124.

When the pressure exchanger is used to exchange pressure between fluids, delaying the supply of a high-pressure fluid from a high-pressure area to one end of the duct 124 and the removal of fluid to a relatively lower pressure area may offset the peak forces caused by these events. For example, when the low or high pressure fluid flow through a duct 124 is stopped by the valves 126, 128, the duct 124 will experience a pressure rise at one end of the duct and a pressure drop at the other end of the duct 124. The fluid flow tends to cavitate when the pressure drop falls below the vapor pressure of the fluid. By offsetting the two valves 126 and 128 this pressure drop can be decreased or eliminated, thus decreasing the occurrence of cavitation in the pressure exchanger 100, 200, 300, 400, 500, 600.

By way further example, and as shown in FIG. 5, when exchangers discussed herein are implemented as pressure exchangers, high-pressure fluid may be supplied through a first fluid stream to the pressure exchanger 100 through port 102 (i.e., HPI 103). Rotating valve 126 selectively supplies the high-pressure fluid into one or more ducts 124 via axial port 134. Low-pressure fluid (to be pressurized) that has been previously supplied to ducts 124 through port 106 (FIG. 1) (i.e., LPI 107) and through the rotating valve 128 and radial ports 136 may be pressurized by the high-pressure fluid and the now pressurized fluid previously within the ducts 124 may be at least partially expelled from the ducts 124 directed through the valve 128 via the axial port 134, and exit the pressure exchanger 100 via port 104 (i.e., HPO 105).

As the valve assembly 101 travels 90 degrees, as shown in FIG. 4, low-pressure fluid (to be pressurized) is supplied to ducts 124 via port 106 (FIG. 1), through the cavity of the end cap 114, and through rotating valve 128 and radial ports 136. The high-pressure fluid that was previous supplied to the ducts 124 via port 102, valve 136, and axial port 134, as above, is now resident in the ducts 124 at a relatively lower pressure as this spent fluid has already been used to pressurize the low-pressure fluid previously supplied to the ducts. This spent fluid may be at least partially expelled from the ducts 124 and may pass through the valve 126 into the cavity of end cap 112 and may exit the pressure exchanger via port 108 (i.e., LPI 109).

As noted above, FIGS. 4 and 5 illustrate positions of the pressure exchanger 100 and valves 126, 128 in 90 degree increments of the valve assembly 101. Accordingly, it will be appreciated that the pressure exchanger 100 may perform the above-described supply of low-pressure and high-pressure fluid, the exchange of fluid pressure, the expelling of the low-pressure and high-pressure fluid in half a rotation of the valve assembly 101. In other words, the above-described supply of low-pressure and high-pressure fluid, the exchange of fluid pressure, the expelling of the low-pressure and high-pressure fluid may occur twice (2 times) in each rotation of the valve assembly 101. Stated in yet another way, FIG. 4 may represent the valve assembly 101 and pressure exchanger 100 at 0 degree and 180 degree increments and FIG. 5 may represent the valve assembly 101 and pressure exchanger 100 at 90 degree and 270 degree increments. Accordingly, the processes described above with reference to FIG. 4 may be occurring simultaneously at 0 degree and 180 degree increments of the valve assembly 101 and pressure exchanger 100 while the processes described above with reference to FIG. 5 are also occurring simultaneously at 90 degree and 270 degree increments of the valve assembly 101 and pressure exchanger 100.

By way of further example, and as shown in FIG. 5, when pressure exchangers discussed herein are implemented in the purification of saline solution using the reverse osmosis membrane process, high-pressure fluid (e.g., a high-pressure super saline solution (brine)) may be supplied through a first fluid stream to the pressure exchanger 100 through port 102 (i.e., HPI 103). Rotating valve 126 selectively supplies the high-pressure super saline solution into one or more ducts 124 via axial port 134. Low-pressure fluid to be pressurized (e.g., an at least partially purified water stream) that has been previously supplied to ducts 124 through port 106 (FIG. 1) (i.e., LPI 107) may be pressurized by the high-pressure super saline solution and may be at least partially expelled from the ducts 124 directed through the valve 128 via the axial port 134, and exit the pressure exchanger 100 via port 104 (i.e., HPO 105).

As the valve assembly 101 travels 90 degrees, as shown in FIG. 4, a low-pressure purified water stream (to be pressurized) is supplied to ducts 124 via port 106 (FIG. 1). The high-pressure super saline solution that was previous supplied to the ducts 124 via port 102, as above, is now resident in the ducts 124 and is now a spent low-pressure super saline solution. This spent low-pressure super saline solution may be at least partially expelled from the ducts 124 and may exit the pressure exchanger via port 108 (i.e., LPI 109).

It is noted that the processes described above are discussed as being somewhat ideal conditions of fluid and/or pressure transfer. It will be appreciated that all the varying fluids at differing pressures and compositions may not be entirely supplied to or removed from the various portions of the pressure exchanger in each step.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims that follow.

The invention claimed is:

1. A device for exchanging pressure between at least two fluid streams, the device comprising:
 a housing having a longitudinal axis and a middle portion forming a plurality of fixed exchange ducts extending in a direction along the longitudinal axis, each exchange duct of the plurality of fixed exchange ducts having openings at a first longitudinal end and a second, opposing longitudinal end; and
 a rotating valve assembly positioned within the housing for directing flow to and from the plurality of exchange ducts, the rotating valve assembly comprising:
  a first valve positioned at and forming an axial seal with the first longitudinal end of the plurality of exchange ducts, the first valve comprising:
   a plurality of openings configured to be in selective communication with each exchange duct of the plurality of exchange ducts; and
   an axial port having an opening extending along a plane perpendicular to a longitudinal axis of the first valve, the opening circumscribing the longitudinal axis of the first valve;
  a second valve positioned at and forming an axial seal with the second longitudinal end of the plurality of exchange ducts, the second valve comprising:
   a plurality of openings configured to be in selective communication with each exchange duct of the plurality of exchange ducts; and
   a second axial port having an opening extending along a plane perpendicular to a longitudinal axis of the second valve, the opening of the second axial portion circumscribing the longitudinal axis of the second valve; and
  wherein each of the first valve and the second valve further comprises the axial port at least partially extending along the longitudinal axis of the housing, each axial port being in communication with an associated port formed in the housing extending in a direction along the longitudinal axis of the housing.

2. The device of claim 1, wherein the middle portion of the housing forming the plurality of fixed exchange ducts comprises a stator housing having the plurality of fixed exchange ducts formed therein and extending therethrough.

3. The device of claim 2, wherein the housing further comprising two end caps positioned at and fixedly coupled to longitudinal ends of the stator housing.

4. The device of claim 1, wherein the middle portion of the housing further comprises two sealing plates, each sealing plate forming a dynamic axial seal with one of the first valve and the second valve.

5. The device of claim 1, further comprising a shaft coupled to and extending between the first valve and the second valve, the shaft configured to rotate the first valve and the second valve about the plurality of fixed exchange ducts formed by the middle portion of the housing.

6. The device of claim 1, wherein the housing further comprising two end caps positioned at and fixedly coupled to longitudinal ends of the middle portion of the housing, wherein each end cap comprises at least one port having a flow path extending in a direction transverse to the longitudinal axis of the housing, and wherein the first valve and the second valve are configured for rotation powered by fluid flow through the at least one port of each end cap.

7. The device of claim 5, further comprising a motor for rotating the shaft, the first valve, and the second valve.

8. The device of claim 5, wherein the first valve and the second valve each comprise two radial ports each having an opening extending along a plane that is parallel to or forms an oblique angle with the longitudinal axis of the housing.

9. The device of claim 1, wherein the housing further comprises:
 a first end cap positioned at the first longitudinal end of the plurality of fixed exchange ducts, the first end cap at least partially surrounding the first valve and comprising at least two upper ports, a first port of the at least two upper ports configured for transferring fluid through the first valve and at least partially into each exchange duct of the plurality of exchange ducts, a second port of the at least two upper ports configured for removing fluid from each exchange duct of the plurality of exchange ducts via the first valve; and
 a second end cap positioned at the second longitudinal end of the plurality of fixed exchange ducts, the second end cap at least partially surrounding the second valve and comprising at least two lower ports, a first port of the at least two lower ports configured to transferring fluid through the second valve and at least partially into each exchange duct of the plurality of exchange ducts, a second port of the at least two lower ports configured for removing fluid from each exchange duct of the plurality of exchange ducts via the second valve.

10. The device of claim 1, wherein at least two openings of the plurality of openings of the first valve that are at least partially aligned with at least two openings of the plurality of openings of the second valve in a direction along the longitudinal axis of the housing are angularly offset from the at least two openings of the plurality of openings of the second valve.

11. The device of claim 1, wherein at least two openings of the plurality of openings of the first valve are angularly offset from at least two openings of the plurality of openings of the second valve by an angular distance between 0.01 degree and 10 degrees.

12. The device of claim 1, further comprising at least one duct piston positioned in each exchange duct of the plurality of exchange ducts.

13. The device of claim 1, wherein the axial port in each of the first valve and the second valve splits into two channels that form two opposing openings of the plurality of openings in each of the first valve and the second valve.

14. The device of claim 1, wherein each of the first valve and the second valve further comprises two radial ports at least partially formed in opposing lateral sides of the associated valve, the two radial ports of each of the first valve and the second valve being in communication with an associated port formed in the housing extending in a direction transverse to the longitudinal axis of the housing.

15. The device of claim 14, wherein the two radial ports of each of the first valve and the second valve form two opposing openings of the plurality of openings in each of the first valve and the second valve.

16. A device for exchanging pressure between at least two fluid streams, the device comprising:
a housing having a longitudinal axis and a middle portion forming a plurality of fixed exchange ducts extending in a direction along the longitudinal axis, each exchange duct of the plurality of fixed exchange ducts having openings at a first longitudinal end and a second, opposing longitudinal end; and
a rotating valve assembly positioned within the housing for directing flow to and from the plurality of exchange ducts, the rotating valve assembly comprising:
a first valve positioned at the first longitudinal end of the plurality of exchange ducts, the first valve comprising a plurality of openings configured to be in selective communication with each exchange duct of the plurality of exchange ducts;
a second valve positioned at the second longitudinal end of the plurality of exchange ducts, the second valve comprising a plurality of openings configured to be in selective communication with each exchange duct of the plurality of exchange ducts, wherein at least two openings of the plurality of openings of the first valve are each at least partially aligned with a corresponding opening of the plurality of openings of the second valve in a direction along the longitudinal axis of the housing, and wherein each opening of the at least two openings of the first valve is angularly offset from the corresponding opening of the second valve; and
wherein each of the first valve and the second valve further comprises an axial port at least partially extending along the longitudinal axis of the housing, each axial port being in communication with an associated port formed in the housing extending in a direction along the longitudinal axis of the housing.

17. The device of claim 16, wherein each opening of the plurality of openings of the first valve is angularly offset from a corresponding opening of the plurality of openings of the second valve.

18. The device of claim 16, wherein the at least two openings of the plurality of openings of the first valve are angularly offset from the corresponding opening of the plurality of openings of the second valve by an angular distance between 0.01 degree and 10 degrees.

19. The device of claim 16, wherein a leading edge of each opening of the plurality of openings of the first valve rotationally leads, in a direction of intended rotation of the valve assembly, a leading edge of a corresponding opening of the plurality of openings of the second valve.

20. The device of claim 16, wherein a leading edge of each opening of the plurality of openings of the first valve rotationally trails, in a direction of intended rotation of the valve assembly, a leading edge of a corresponding opening of the plurality of openings of the second valve.

21. The device of claim 16, wherein the angular offset of the first valve and the second valve is configured to produce a phase shift between the first valve and the second valve by varying the timing between initial communication with an exchange duct of the plurality of exchange ducts by the at least one opening of the plurality of openings of the first valve and initial communication with the same exchange duct of the plurality of exchange ducts by the corresponding opening of the plurality of openings of the second valve.

* * * * *